(12) United States Patent
Fujimura et al.

(10) Patent No.: US 9,363,021 B2
(45) Date of Patent: Jun. 7, 2016

(54) RECEIVER OPTICAL MODULE INCLUDING OPTICAL DE-MULTIPLEXER, LENSES, AND PHOTODIODES VERTICALLY ARRANGED TO EACH OTHER WITHIN HOUSING

(71) Applicant: Sumitomo Electric Industries, Ltd., Osaka-shi (JP)

(72) Inventors: Yasushi Fujimura, Yokohama (JP); Fumihiro Nakajima, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 118 days.

(21) Appl. No.: 14/365,067

(22) PCT Filed: Feb. 21, 2013

(86) PCT No.: PCT/JP2013/055268
§ 371 (c)(1),
(2) Date: Jun. 12, 2014

(87) PCT Pub. No.: WO2013/125728
PCT Pub. Date: Aug. 29, 2013

(65) Prior Publication Data
US 2014/0346323 A1 Nov. 27, 2014

(30) Foreign Application Priority Data

Feb. 21, 2012 (JP) ................. 2012-034838
Mar. 23, 2012 (JP) ................. 2012-066871

(51) Int. Cl.
*H04B 10/60* (2013.01)
*G02B 6/42* (2006.01)
*G01J 1/44* (2006.01)

(52) U.S. Cl.
CPC . *H04B 10/60* (2013.01); *G01J 1/44* (2013.01); *G02B 6/4214* (2013.01);
(Continued)

(58) Field of Classification Search
CPC .... G01J 1/44; G01J 2001/446; G02B 6/4214; G02B 6/4215; G02B 6/4244; G02B 6/4261; G02B 6/4265; H04B 10/60
See application file for complete search history.

(56) References Cited

U.S. PATENT DOCUMENTS 7,366,371 B1 4/2008 Wen et al.
2003/0215240 A1* 11/2003 Grann ................ G02B 6/29367
398/85
(Continued)

FOREIGN PATENT DOCUMENTS

CN 1790076 A 6/2006
CN 101266325 A 9/2008
(Continued)

OTHER PUBLICATIONS

Notification of the First Office Action in Chinese Application No. 201380010314.3 dated Apr. 23, 2015.
(Continued)

*Primary Examiner* — Francis M Legasse, Jr.
(74) *Attorney, Agent, or Firm* — Venable LLP; Michael A. Sartori; Trent B. Ostler

(57) ABSTRACT

A receiver optical module to facilitate the assembling is disclosed. The receiver optical module includes an intermediate assembly including the optical de-multiplexer and the optical reflector each mounted on the upper base, and the lens and the PD mounted on the sub-mount. The latter assembly is mounted on the bottom of the housing; while, the former assembly is also mounted on the bottom through the lower base. The upper base is apart from the bottom and extends in parallel to the bottom to form a surplus space where the amplifying circuit is mounted.

18 Claims, 17 Drawing Sheets

(52) U.S. Cl.
CPC .......... *G02B 6/4215* (2013.01); *G02B 6/4244* (2013.01); *G02B 6/4265* (2013.01); *G01J 2001/446* (2013.01); *G02B 6/4261* (2013.01)

(56) References Cited

U.S. PATENT DOCUMENTS

| | | | | |
|---|---|---|---|---|
| 2007/0242957 | A1* | 10/2007 | Zhu | G02B 6/29362 398/182 |
| 2011/0058771 | A1 | 3/2011 | Lee et al. | |
| 2011/0222817 | A1 | 9/2011 | Smaglinski et al. | |

FOREIGN PATENT DOCUMENTS

| | | |
|---|---|---|
| CN | 101356699 A | 1/2009 |
| CN | 101441301 A | 5/2009 |
| CN | 101918872 A | 12/2010 |
| CN | 103163605 A | 6/2013 |
| DE | 102010003226 A1 | 9/2011 |
| JP | 11-311721 A | 11/1999 |
| JP | 2009-198576 A | 9/2009 |
| JP | 2009-198958 A | 9/2009 |
| JP | 2010-191231 A | 9/2010 |
| WO | WO-01/02887 | 1/2001 |
| WO | WO 2006/134675 A1 | 12/2006 |

OTHER PUBLICATIONS

International Search Report and Written Opinion in PCT International Application No. PCT/JP2013/055268, dated May 31, 2013.
Notice of Reasons for Rejection in Japanese Patent Application No. 2012-034838, dated Dec. 15, 2015.

* cited by examiner

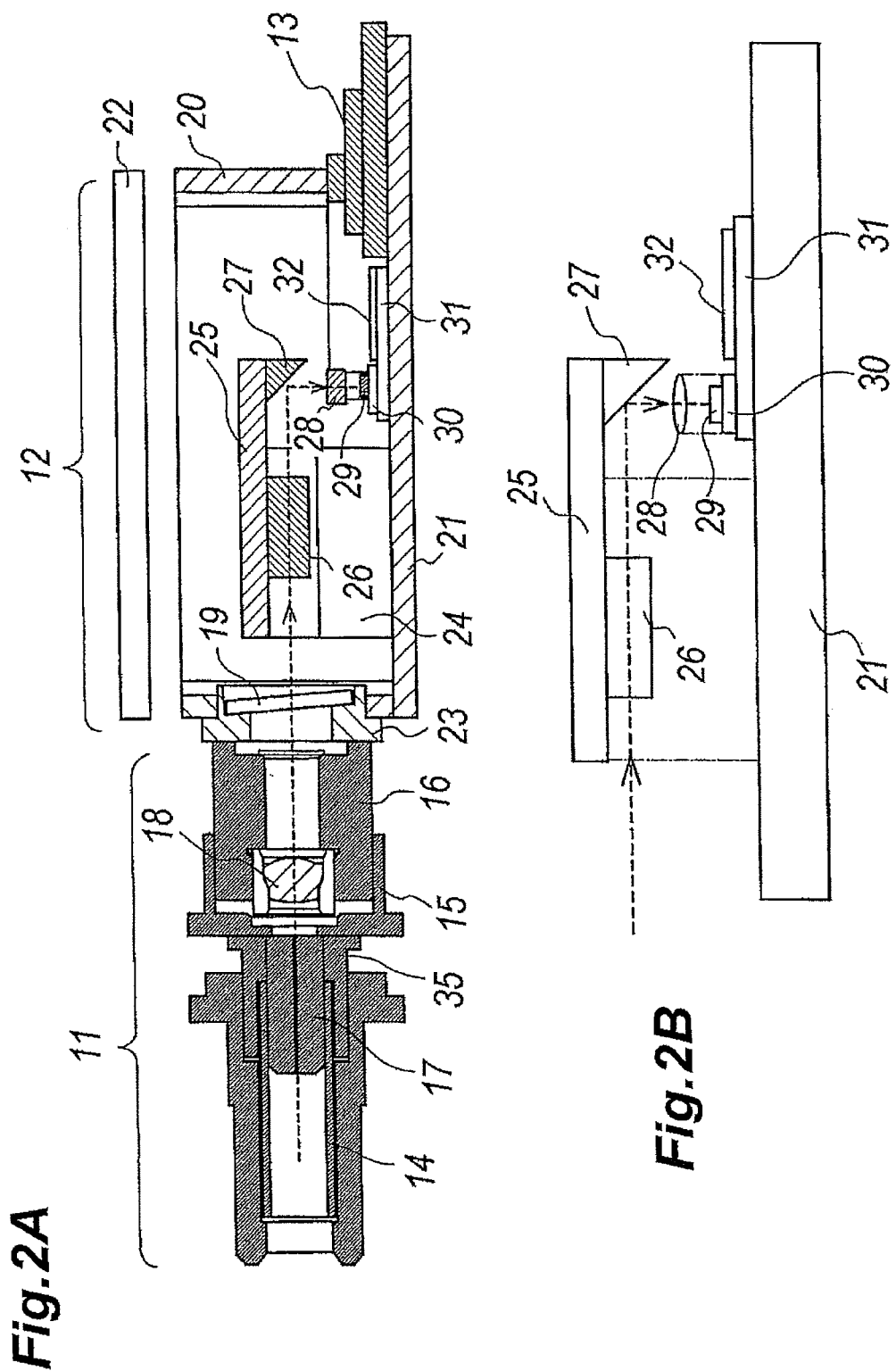

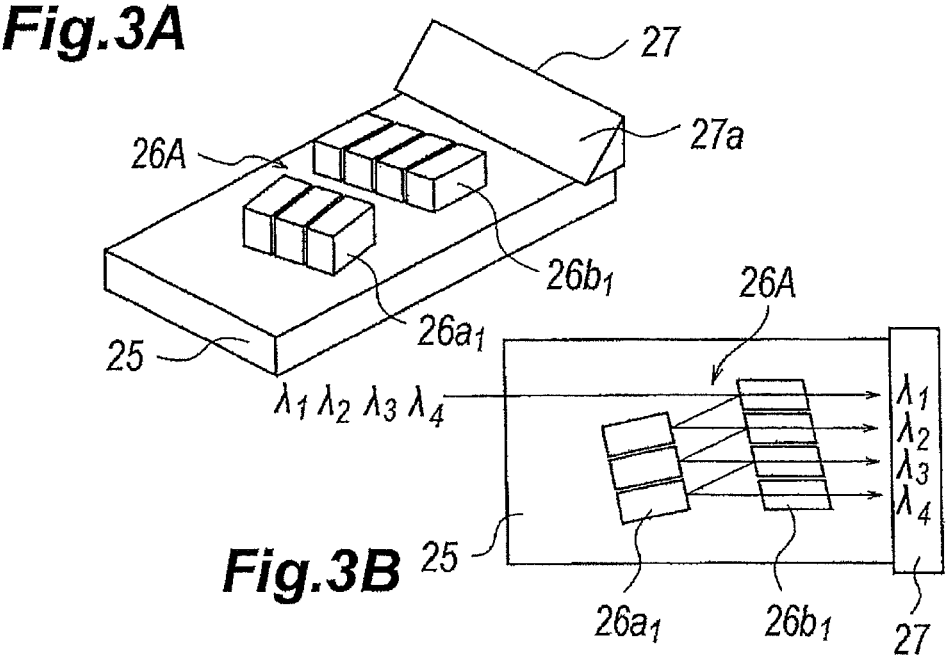
Fig.3A
Fig.3B
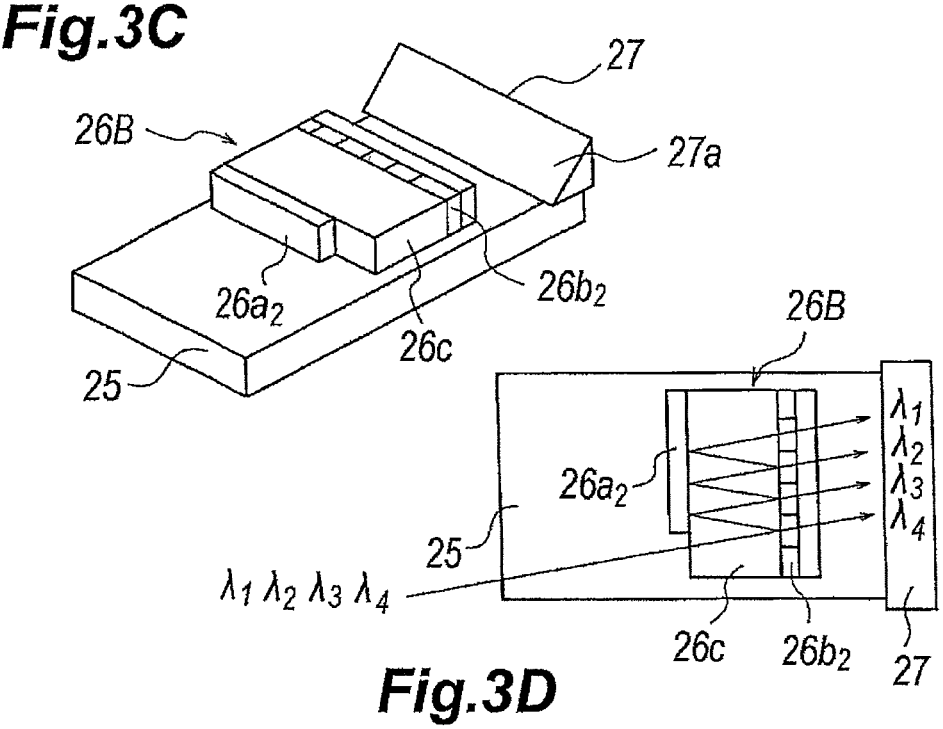
Fig.3C
Fig.3D

RECEIVER OPTICAL MODULE INCLUDING OPTICAL DE-MULTIPLEXER, LENSES, AND PHOTODIODES VERTICALLY ARRANGED TO EACH OTHER WITHIN HOUSING

TECHNICAL FIELD

An embodiment of the present invention relates to a receiver optical module to be installed within an optical transceiver, and in particular relates to a receiver optical module to receive wavelength multiplexed optical signals.

BACKGROUND ART

The wavelength division multiplexing (WDM) system has become popular in the optical communication system. One prior patent application has disclosed an optical transceiver that is implemented with four transmitter optical sub-assemblies (TOSA) each operable in 10 Gbps, four receiver optical sub-assemblies (ROSA) each operable also in 10 Gbps, an optical multiplexer, and an optical de-multiplexer. Such an optical transceiver has realized the transmission speed of 40 Gbps.

FIG. 8A is a plan view of an optical arrangement of components which realizes the optical de-multiplexing function, while, FIG. 8B is a side view thereof. The multiplexed optical signal provided from the external optical fiber 1 passes an optical medium 5 after it is reflected by a mirror 4 and fully reflected by the optical reflector 5a. The optical filter 5b of a type of multi-layered filter transmits only one of optical signals with a specific wavelength $\lambda_1$ but reflects rest of optical signals at a first portion thereof. Only one of rest of optical signals with another specific wavelength $\lambda_2$ transmits the optical filter in the second portion thereof after they passes the optical medium 5 and reflected by the reflector 5a. Further, rest of optical signals is reflected by the optical filter 5b in the second portion thereof. The third portion of the optical filter 5b can transmits only one of optical signals with the third specific wavelength $\lambda_3$, and the fourth portion of the optical filter 5b transmits the rest optical signal with the fourth specific wavelength $\lambda_4$. Thus, the optical signals with a plural wavelengths, $\lambda_1$ to $\lambda_4$, can be de-multiplexed and received by respective photodiodes (hereafter denoted by "PD") 7a.

A conventional optical module for the multiplexed optical signals, the optical components such as the optical de-multiplexer, the mirror block, the lenses, the PDs, and so on, are two dimensionally arranged in the base. This arrangement expands the footprint of the components. Recent optical transceivers are forced to make further compact in dimensions thereof. For such requests, the two-dimensional arrangement of the optical components becomes fatal factor to obstruct the installation of the optical module within a compact optical transceiver.

SUMMARY OF INVENTION

One aspect of the present application relates to an optical module that receives optical signals each having a specific wavelength different from others. The optical module according to one embodiment includes an intermediate assembly, a plurality of lenses, a plurality of PDs, and a housing. The intermediate assembly includes an optical de-multiplexer, an optical reflector, and a base. The optical de-multiplexer de-multiplexes the optical signals incoming to the optical module depending on the specific wavelengths to generate a plurality of de-multiplexed optical signals. The optical reflector reflects the de-multiplexed optical signals toward respective PDs. The base mounts the optical de-multiplexer and the optical reflector thereon. Each of lenses concentrates the de-multiplexed optical signal reflected by the optical reflector on respective PDs. The housing includes a bottom, a side, and a lid to form a space into which the intermediate assembly, the lenses, and the PDs are enclosed. A feature of the optical module according to an embodiment is that the optical reflector, the lenses, and the PDs are arranged vertically with respect to the bottom of the housing.

According to one specific arrangement of the embodiment, the intermediate assembly is mounted on the bottom of the housing such that the optical de-multiplexer and the optical reflector are mounted on a top of the base. According to another specific arrangement of the embodiment, the intermediate assembly is mounted on the lid of the housing such that the optical de-multiplexer and the optical reflector are mounted on a surface of the base facing the bottom of the housing. Such arrangements of the intermediate assembly, the lenses and the PDs makes a surplus space within the housing available, where additional electronic components such as an amplifier to amplify outputs from the PDs is mounted.

BRIEF DESCRIPTION OF DRAWINGS

The foregoing and other purposes, aspects and advantages will be better understood from the following detailed description of a preferred embodiment of the invention with reference to the drawings, in which:

FIG. 2A shows a side cross section of the receiver optical module shown in FIG. 1, and FIG. 2B magnifies the optical coupling status between the PD and the optical de-multiplexer;

FIGS. 3A and 3B show an embodiment of the optical components mounted on the upper base, and FIGS. 3C and 3D show a modified embodiment of the optical components;

FIG. 10A is viewed from the front top; while, FIG. 10B is viewed from the rear top;

DESCRIPTION OF EMBODIMENTS

First Embodiment

Figure 1:
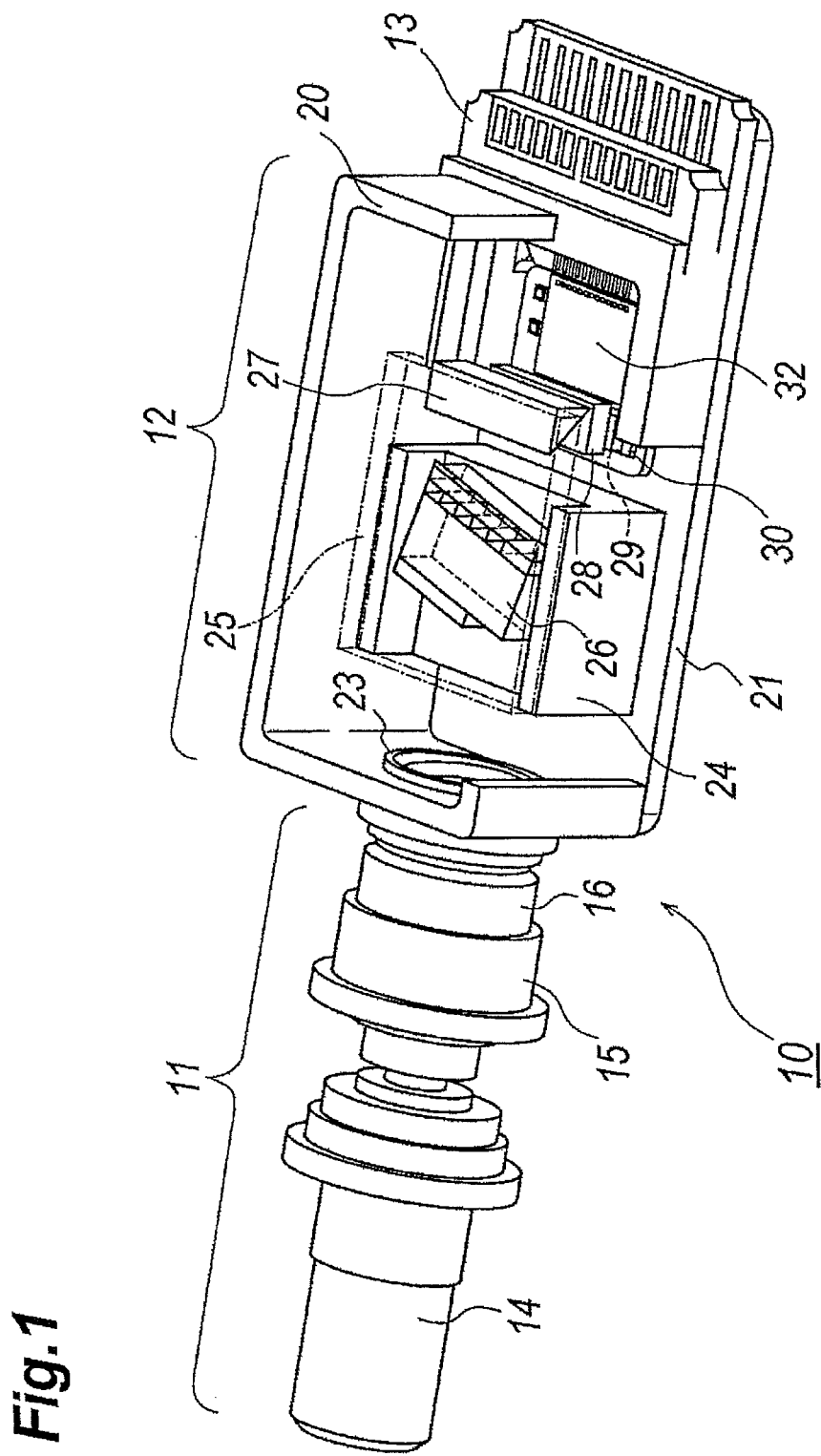
FIG. 1 is a perspective cutaway view of a receiver optical module according to an embodiment of the invention.

Next, some embodiments according to the present invention will be described as referring to drawings. In the description of the drawings, numerals or symbols same as or similar to each other will refer to elements same as or similar to each other without overlapping explanations. FIG. 1 is a perspective view of a receiver optical module, where a portion thereof is removed to show the inside of the module, implemented within an optical transceiver, FIG. 2A shows a cross section of the optical module, and FIG. 2B magnifies a primary portion to couple optical devices installed in the module with an external optical fiber.

The receiver optical module 10 shown in FIG. 1 and FIG. 2A includes a coupling unit 11, a housing 12, and an electrical connector 13. The coupling unit 11 provides a sleeve 14, a joint sleeve 15 (hereafter denoted as J-sleeve), a joint 16, a stub 17, and a first lens 18. The housing 12, which has a box shape, provides a side 20, a bottom 21 and a lid 22. A front side 20 of the housing 12 provides an optical window 19 held by the holder 23. The bottom 21 mounts a primary portion of the module thereon. The primary portion includes an upper base 25, an optical de-multiplexer 26 and an optical reflector 27, where the optical de-multiplexer 26 and the optical reflector 27 are mounted on the upper base 25, and the upper base 25 is indirectly mounted on the bottom 21 through the lower base 24. The primary portion further includes a plurality of PDs 29, a plurality of second lenses 28 to concentrate light on the PDs 29, and an amplifying circuit 32. The PDs 29 are directly mounted on a sub-mount 30. The PDs 29 with the sub-mount 30, the second lenses 28, and the amplifier circuit 32 are mounted on the bottom 21 through a metal base 31.

The sleeve 14 receives in a front portion thereof a ferrule secured in a tip of an external fiber, which is not illustrated in the figures, while the rest portion of the coupling unit 11 close to the housing 12 receives a tip portion of the stub 17. The root portion of the stub 17 is press-fitted within a bush 35. The J-sleeve 15 optically couples the PDs 29 with the external fiber. Specifically, the optical alignment along the optical axis denoted by an arrow in the figure is performed by adjusting the insertion depth of the joint 16 within the J-sleeve 15; while, the optical alignment perpendicular to the optical axis is performed by sliding the bush 35 on an end surface of the J-sleeve 15.

The housing 12 has a box shape. The side 20 may be made of metal, typically an alloy of iron, nickel, and cobalt, which is generally called as Kovar; while, the bottom 21 may be made of metal, for instance, copper molybdenum (CuMo), copper tungsten (CuW), and so on. The lid 22 air-tightly seals the inside of the housing 12. The electronic connector 13 is a type of the multi-layered ceramics with a plurality of electronics pads in the top surfaces thereof.

The joint 16, which may be made of metal, is welded to the holder 23, and the holder 23 is fixed to the front side 20 of the housing 12. The joint 16 holds the first lens 18 therein. The first lens collimates light provided from the external fiber set in in the sleeve 14. The collimated light advances to the optical de-multiplexer 26 through the window 19.

The optical de-multiplexer 26 de-multiplexes the light into a plurality of optical beams. Specifically, the light incoming to the optical module 10 from the external fiber includes a plurality of optical signals each having a specific wavelength different from each other, and the optical de-multiplexer 26 divides the light into respective optical signals depending on the wavelengths thereof. Details of the optical de-multiplexer 26 will be described later. The de-multiplexed optical signals enter the optical reflector 27, are reflected thereby downwardly toward the bottom 21, and finally enter the PDs 29 through the second lens 28. The optical de-multiplexer 26 and the optical reflector 27 are supported by the upper base 25, and the upper base 25 is supported by the lower base 24. That is, the optical de-multiplexer 26 and the optical reflector 27 are mounted in the bottom surface of upper base 25, and the upper base 25 is mounted on the lower base 24 such that the bottom surface of the upper base 25 faces and makes substantially in parallel to the bottom 21 of the housing 12.

Each of the respective optical signals de-multiplexed by the optical de-multiplexer 26 is focused by the second lens 28 and then received by the PD 29. The PD 29 is mounted on the metal base 31 through the sub-mount 30. The lens 28, as described in detail later, may be integrated on the PD 29, or mounted in the bottom surface of the upper base 25 as those of the optical de-multiplexer 26 and the optical reflector 27.

As schematically illustrated in FIG. 2B, the optical de-multiplexer 26 and the optical reflector 27 are arranged in the upper base 25. Specifically, they are arranged in the bottom surface of the upper base 25 so as to be apart from the bottom 21 of the housing 12. On the other hand, the PDs 29 and the second lenses 28 are arranged on the bottom 21 through the sub-mount 30 and the metal base 31 such that the PDs 29, the second lenses 28, and the optical reflector 27 are vertically arranged. Thus, the optical components from the optical de-multiplexer 26 to the sub-mount 30 are three dimensionally arranged in the housing 12, which forms a surplus space within the housing 12 to install the amplifying circuit 32 in close to the PDs 29 without enlarging the size of the housing 12.

FIGS. 3A to 3D show various arrangements of the optical de-multiplexer 26 and the optical reflector 27 mounted in the upper base 25.

The optical de-multiplexer 26A shown in FIGS. 3A and 3B divides the optical filters $26b_1$ from optical reflectors $26a_1$. In this arrangement shown in FIGS. 3A and 3B, the optical reflectors $26a_1$ each has a characteristic to reflect light with all wavelengths under consideration, $\lambda_1$ to $\lambda_4$; while, the optical filters $26b_1$ each transmits only one of optical signals with a specific wavelength and reflects the other optical signals. Specifically, the first optical filter $26b_1$ that receives the optical signals with wavelengths of $\lambda_1$ to $\lambda_4$ transmits only the optical signal with the wavelength $\lambda_1$ but reflects the other optical signals with wavelengths of $\lambda_2$ to $\lambda_4$, which are reflected by the first reflector $26a_1$ and enter the second filter $26b_1$. The second filter $26b_1$ transmits only the optical signal with the wavelength of $\lambda_2$ but reflects the optical signals with the wavelengths of $\lambda_3$ and $\lambda_4$, which are reflected by the second reflector $26a_1$ and enter the third filter $26b_1$. The third filter $26b_1$ transmits only the optical signal with the wavelength of $\lambda_3$ but reflects the optical signal with the wavelength of $\lambda_4$, which is reflected by the last reflector $26a_1$ and enters the last filter $26b_1$. The last filter $26b_1$ transmits only the optical signal with the wavelength of $\lambda_4$. When the optical signals incoming to the optical module 10 have only the wavelength of $\lambda_1$ to $\lambda_4$ without any other wavelengths, the last optical filter $26b_1$ may be eliminated.

The optical reflector 27 is, for instance, made of glass with a reflecting surface 27a coated with a reflecting medium, or a type of the prism made of glass material. The reflecting surface 27a of the bulk reflector 27 makes an angle of 45° with respect to the optical axis of the optical de-multiplexer 26 and that of the PDs 29. The respective optical signals de-multiplexed by the de-multiplexer 26 are reflected by the reflecting surface 27a toward the second lenses 28 to be received by the PDs 29.

FIGS. 3C and 3D show another arrangement of the optical de-multiplexer 26B. This optical de-multiplexer 26B integrates the single optical reflector $26a_2$, and optical filters $26b_2$ each attached to a transparent body 26c. The optical signals with the wavelengths of $\lambda_1$ to $\lambda_4$ incoming to the optical module 10 enters the transparent body 26c, which is made of material transparent to the optical signals with the wavelengths of $\lambda_1$ to $\lambda_4$. The first filter $26b_2$ transmits only the optical signal with the wavelength of $\lambda_1$ but reflects the other optical signals with the wavelengths of $\lambda_2$ to $\lambda_4$, which transmit the transparent body 26, are reflected by the optical reflector $26a_2$, transmit the transparent body 26 again and enter the second optical filter $26b_2$. The second optical filter $26b_2$ transmits only the optical signal with the wavelength of $\lambda_2$ but reflects other optical signals, and so on similar to those of the aforementioned arrangement shown in FIGS. 3A and 3B.

When the optical filters, $26b_1$ and $26b_2$, are the type of the band-pass filter, the arrangement thereof is not restricted to those of the order of the wavelength. On the other hand, when the optical filters, $26b_1$ and $26b_2$, are the type of the high-pass or low-pass filter, the order thereof is necessary to be the order of the wavelength.

Figure 4A:
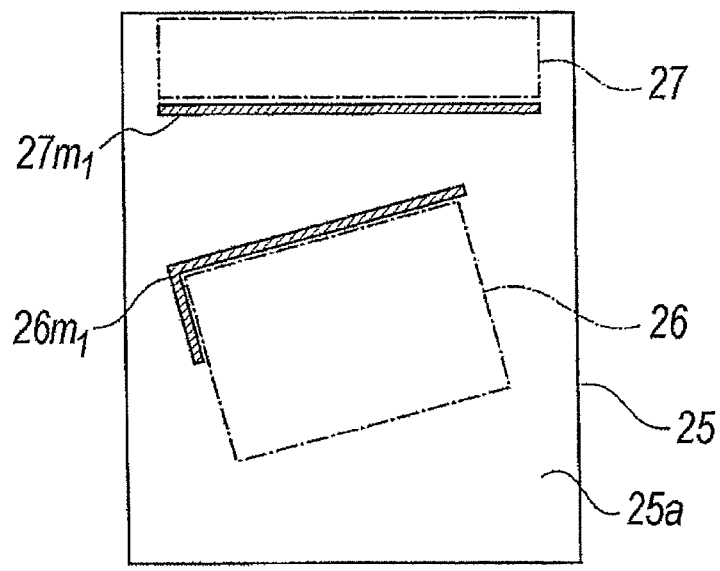
FIGS. 4A and 4B are plan views showing an alignment marks prepared on the surface of the upper base to mount the optical de-multiplexer and the optical reflector thereon.
Figure 4B:
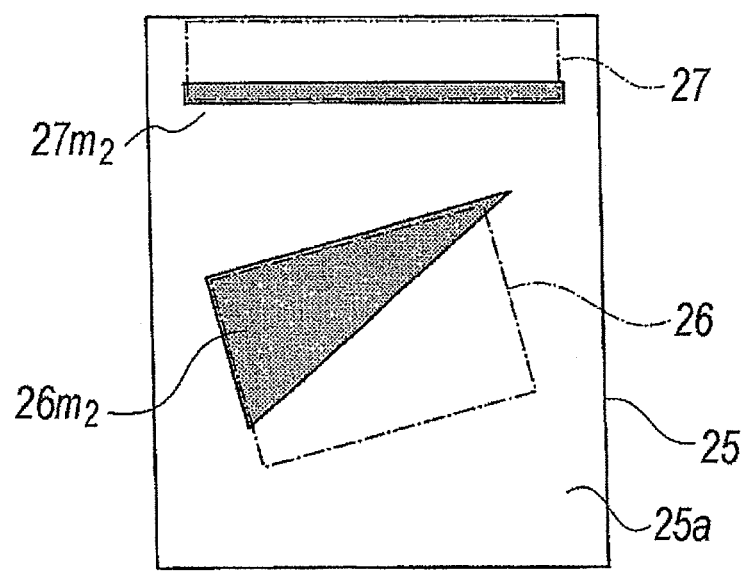

FIGS. 4A and 4B explain examples of a method to mount the optical de-multiplexer 26 on the bottom surface 25a of the upper base 25. The upper base is made of, for instance, ceramics such as aluminum (Al2O3) and has alignment marks with a form of lines, $26m_1$ and $27m_1$, shown in FIG. 4A, or with two dimensional shapes, $26m_2$ and $27m_2$ shown in FIG. 4B. The alignment mark for the optical de-multiplexer 26 has an L-shaped line $26m_1$, or a right triangle $26m_2$. The optical de-multiplexer 26 is aligned in the corner thereof with the corner of the L-shaped line $26m_1$, or with the right corner of the triangle $26m_2$. The optical reflector 27 in the front edge thereof is aligned with the line $27m_1$, or with an edge of the band $27m_2$. The optical de-multiplexer 26 and the optical reflector 27 are assembled with the upper base 25, and can be handled as one component as the second intermediate assembly.

Figure 5A:
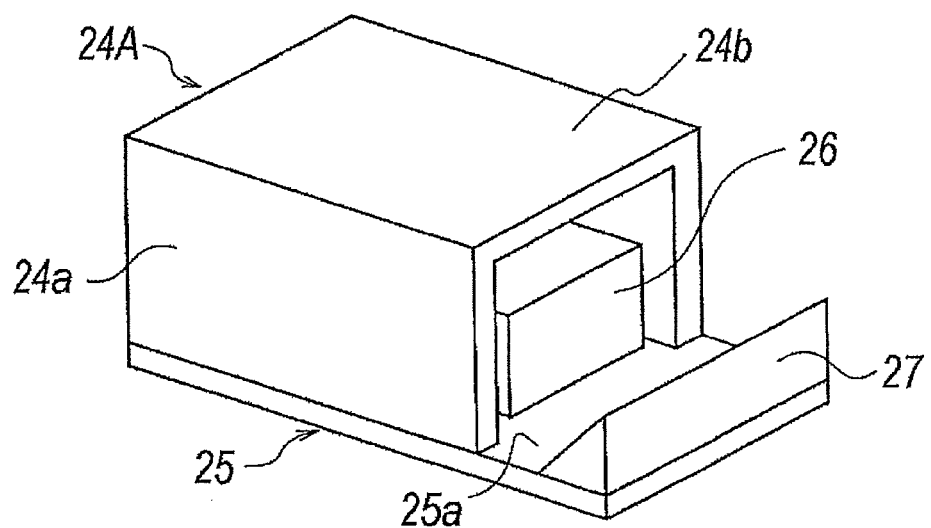
FIG. 5A shows an intermediate assembly including the optical de-multiplexer and the optical reflector mounted on the upper base which is assembled with the lower base.
Figure 5B:
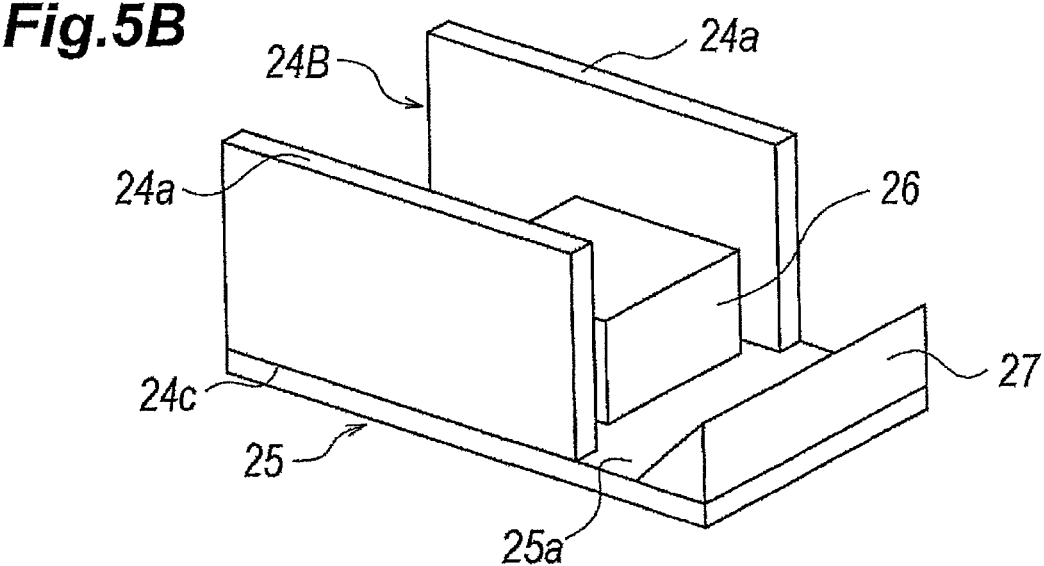
FIG. 5B shows another intermediate assembly modified from the aforementioned assembly.

FIGS. 5A and 5B are perspective views of the intermediate assembly including the optical de-multiplexer 26 and the optical reflector 27 to be assembled with the lower base 24A or 24B. The lower base 24A shown in FIG. 5A has a U-shaped cross section with tips of the sides 24a fixed to respective ends of the bottom surface 25a of the upper base 25. Two sides 24a of the U-shape surround the optical de-multiplexer 26. The bottom 24b of the U-shape is to be fixed to the bottom 21 of the housing 12 of the optical module 10. The lower base 24, 24A or 24B may be made of material with linear expansion co-efficient close to the upper base 25, which is, for instance, aluminum oxide (Al2O3), aluminum nitride (AlN), cupper molybdenum (CuMo), copper tungsten (CuW), and so on.

The lower base 24B shown in FIG. 5B divides two sides of the U-shape in FIG. 5A into independent sides 24a arranged substantially in parallel to each other at respective sides of the upper base 25. One end 24c of the side 24a is fixed to the bottom surface 25a of the upper base 25. Although the bottom base 24B in FIG. 5B in the side 24a thereof is independent of the upper base 25, the side 24a can be integrally formed with the upper base 25.

The assembly with the upper base 25, on which the optical de-multiplexer 26 and the optical reflector 27 are mounted, and the lower base 24 fixed to the upper base 25 are to be mounted on the bottom 21 of the housing 12 as illustrated in FIGS. 2A and 2B. The upper base 25 in the bottom surface 25a thereof is independent of and extends in parallel to the bottom 21 of the housing 12. This arrangement can substantially extend an area to mount components thereon.

Figure 6:
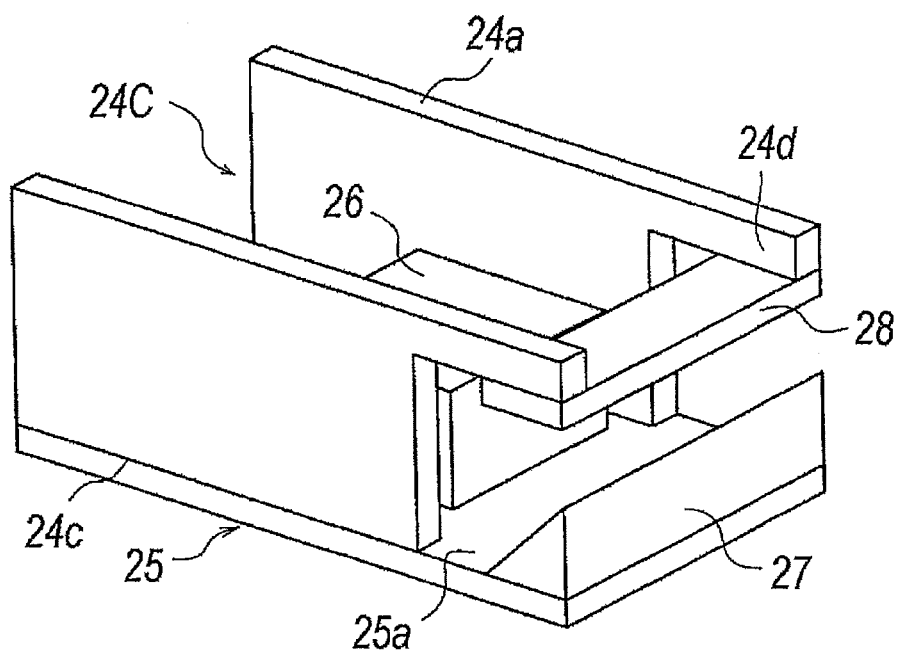
FIG. 6 shows a still another modification of the intermediate assembly.

FIG. 6 is a perspective view showing still another embodiment of the lower base 24C. This lower base 24C cuts the side 24a in the rear portion thereof to leave a saddle 24d, on which the second lens 28 is mounted. The second lens 28 of the present embodiment is a type of, what is called, the arrayed lens 28B including a plurality of lens elements such as shown in FIG. 7B. Each of the lens elements corresponds to one of the optical signals de-multiplexed by the optical de-multiplexer 26 and concentrates the corresponding optical signal to the corresponding PD 29. Thus, the embodiment shown in FIG. 6 forms an intermediate assembly integrating the optical de-multiplexer 26, and the optical reflector with the second lens 28.

Figure 7A:
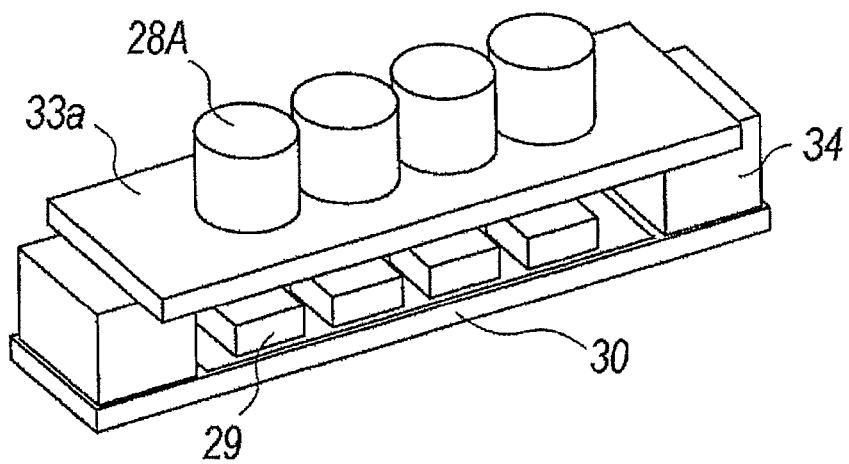
FIGS. 7A to 7C show an arrangement of the PD module, where the lens support, which is supported by the metal base, by the spacer so as to set the second lens apart from the PDs.
Figure 7B:
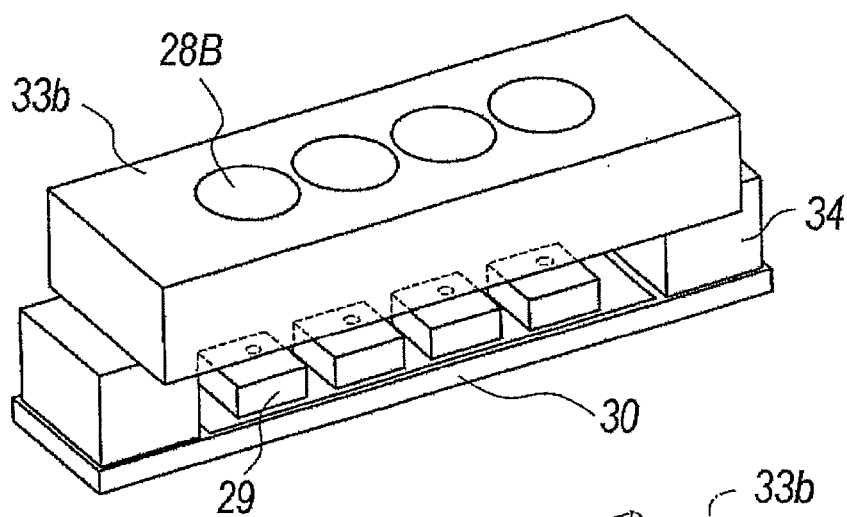
Figure 7C:
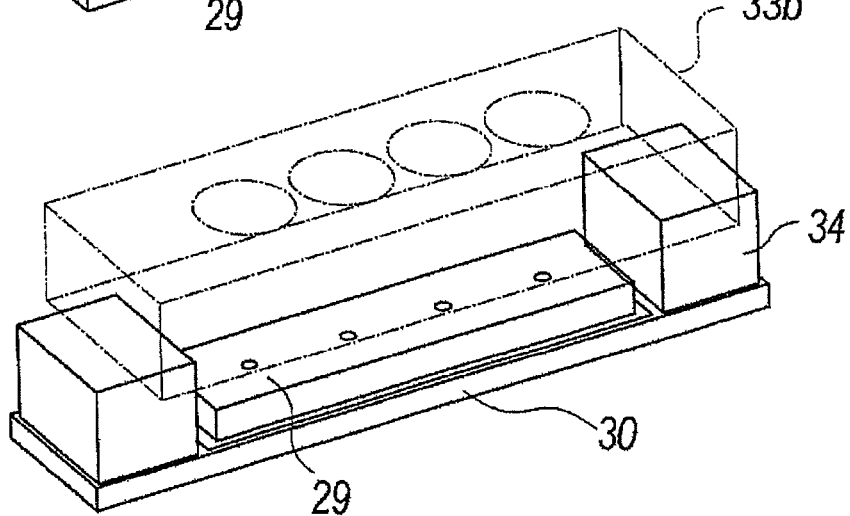
Figure 8A:
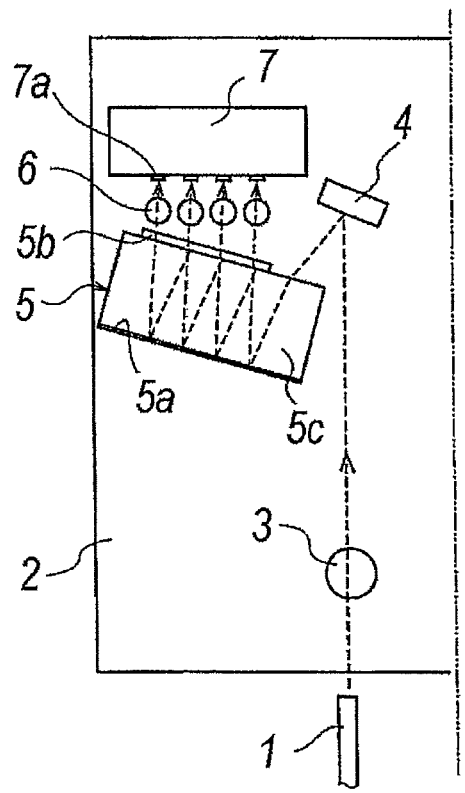
FIG. 8A is a plan view and FIG. 8B is a side view of the optical coupling status implemented in a conventional optical module.
Figure 8B:
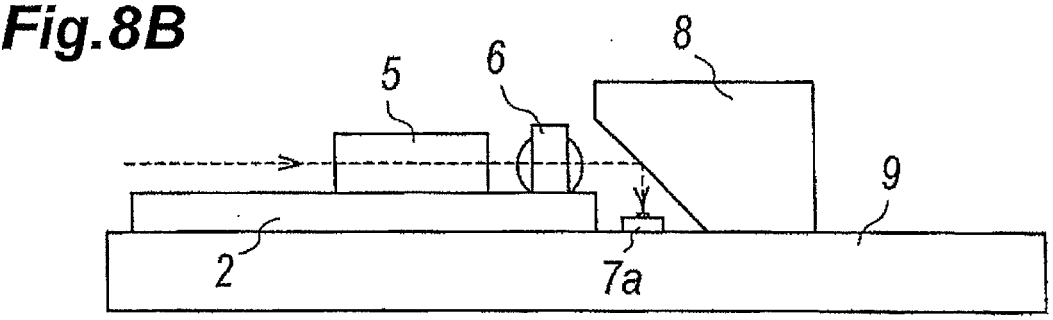

FIGS. 7A to 7C are perspective views each showing the lens assembly including the second lenses 28 and the PDs 29 mounted on the sub-mount 30. The embodiment shown in FIG. 7A has a plurality of lens elements 28A independent to each other and corresponding to respective PDs 29. Although the lens elements 28A shown in FIG. 7A each has a cylindrical shape, the lens elements 28A may be a spherical lens. The lens 28A in the present embodiment is supported by the lens support 33a, and this lens support 33a is supported by the spacer 34 provided in the ends of the sub-mount 30. The lens support 33a may have holes to pass the optical signals concentrated by the lens 28A and then advancing to respective PDs 29. The PDs 29 shown in FIGS. 7A and 7B have a plurality of PDs; while, the PD 29 shown in FIG. 7C integrates a plurality of element devices in one body but have light-receiving surfaces independent from others.

The embodiment shown in FIG. 7B has, what is called, the arrayed lens 28B including a plurality of lens elements corresponding to respective PDs 29 and supported by the body 33b. The body 33b, as the lens support 33a in the former embodiment, is supported by the spacer 34 in both ends thereof. FIG. 7C shows an alternative of the PDs 29, what is called, an arrayed PD 29. Thus, the PD 29 mounted on the sub-mount 30 and the second lens 28 form an intermediate assembly processed as one element, which facilitates the assembly of the optical module 10.

Next, the process to assemble the receiver optical module 10 will be described. First, the process mounts the optical de-multiplexer 26 and the optical reflector 27 on the bottom surface 25a of the upper base 25. In the step of assembly, only the alignment marks shown in FIG. 4A or 4B is utilized to position the optical de-multiplexer 26 and the optical reflector 27. Concurrently with the assembly of the optical de-multiplexer 26, the PDs 29 are optically aligned with the second lens 28. Specifically, the PDs 29, the spacer 34, and the amplifying circuit 32 are first mounted on the sub-mount 30. Next, the PDs 29 are wire-bonded with the amplifying circuit 32. Then, the support 33 with the second lens 28 is optically aligned with the PDs 29. This alignment is carried out only by the physical dimensions of the lens 28, the lens support 33 and the spacer 34, because the optical sensing surface of the lens 29 is relatively wide, typically several tenses of micron meters in a diameter thereof, which moderates the positional accuracy between the lenses 28 and the PDs 29.

Subsequently, the former assembly of the lenses 28 and PDs 29 is mounted on the position of the bottom 21 of the housing 12. Finally, the other intermediate assembly of the upper base 25 with the optical de-multiplexer 26 and the optical reflector 27 is mounted on the bottom 21 of the housing 12 as aligning the optical de-multiplexer 26 with the coupling unit 11. Specifically, the front edge of the intermediate assembly is first abutted against the front side 20 of the housing 12. Then, the intermediate assembly is slid rearward along the optical axis on the bottom 21 by a preset distance. Lastly, fine alignments along the longitudinal and lateral directions around this position are carried out until a preset coupling efficiency between respective PDs 29 and the coupling unit 11 is obtained. Because the present receiver optical module 10 implements with two intermediate assemblies, one of which includes the upper base 25 with the optical de-multiplexer 26 and the optical reflector 27, the other of which includes the PDs 29 on the sub-mount 30 and the second lens 28; the process to complete the receive optical module 10 may be facilitated.

Second Embodiment

Figure 9:
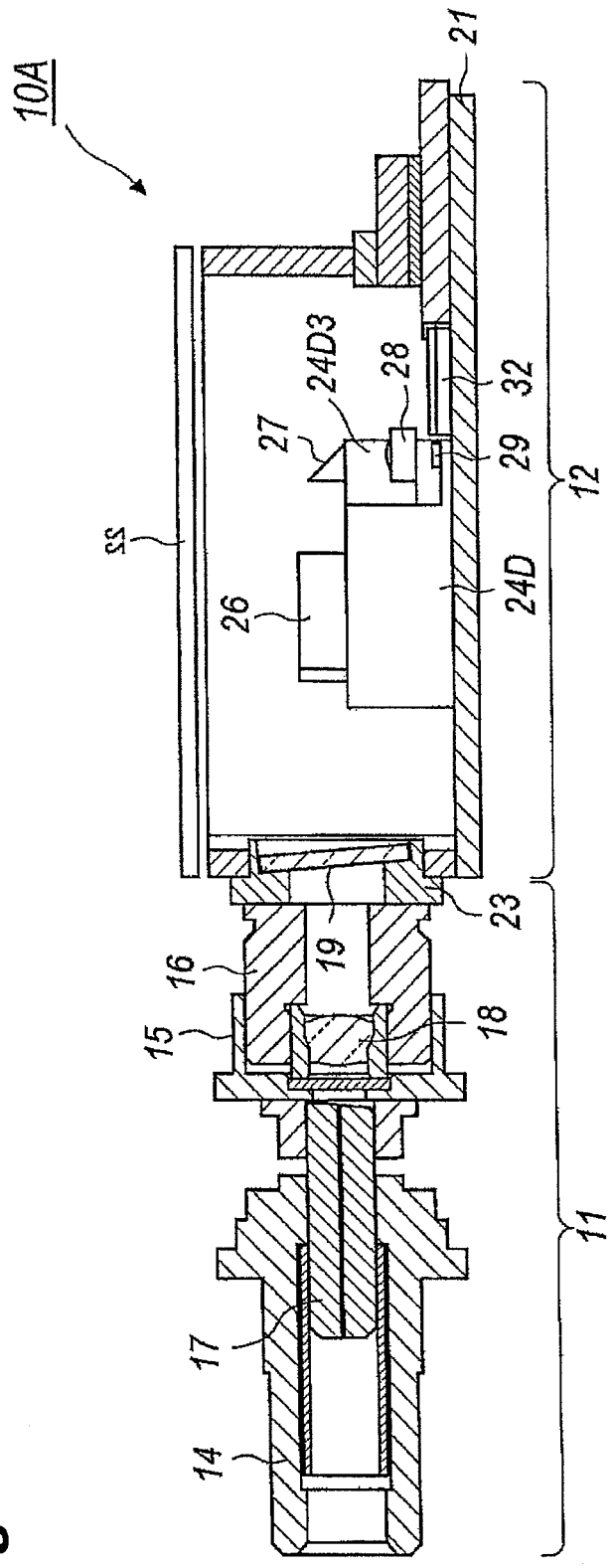
FIG. 9 shows a cross section of an optical module according to still another embodiment of the invention.
Figure 10A:
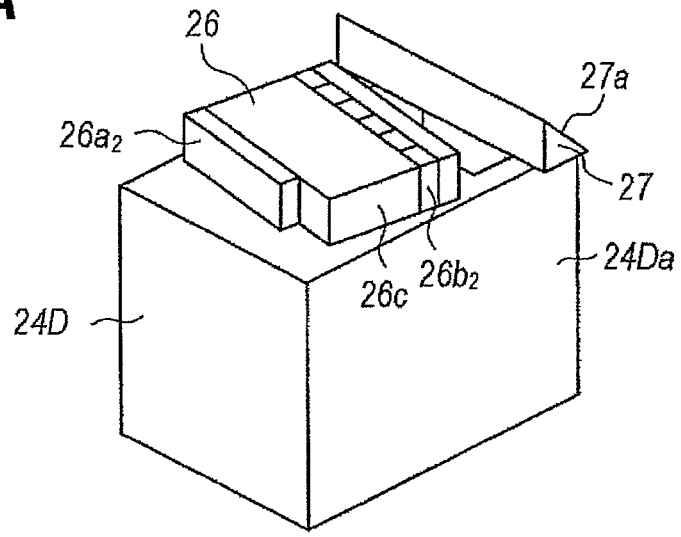
FIGS. 10A and 10B are perspective views of the intermediate assembly shown in FIG. 9, where
Figure 10B:
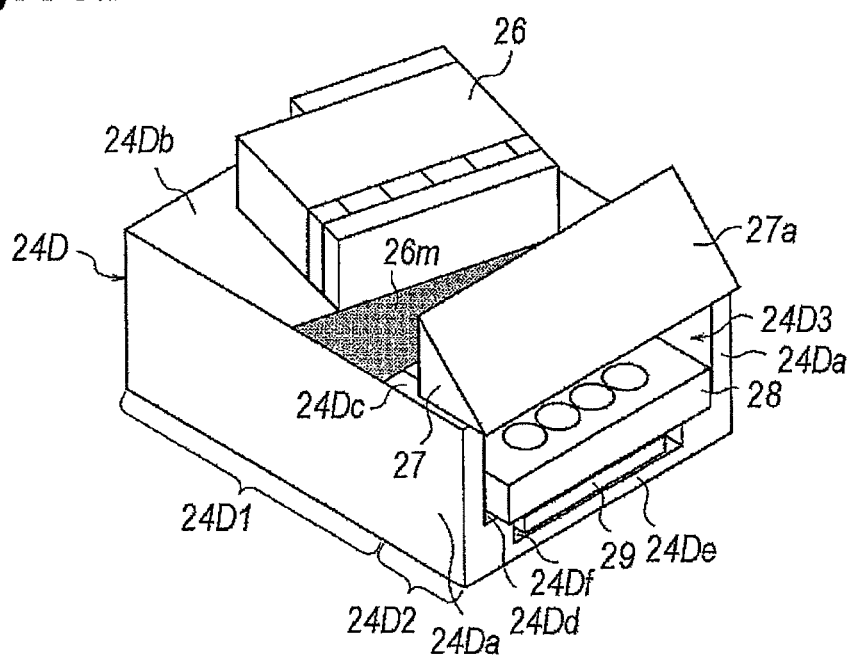

FIG. 9 shows a cross section of an optical module 10A according to the second embodiment of the invention, and FIGS. 10A and 10B are perspective views of the intermediate assembly thereof, where FIG. 10A is viewed from the front, while, FIG. 10B is viewed from the rear. In the description, the direction of the front and the rear are used only for the explanation sake. The front only means a side where the coupling unit 11 is provided, and the rear only means the side opposite to the front. The optical module 10A, compared with aforementioned optical module 10, provides a modified lower base 24D. Other arrangements in the optical module 10A are substantially same as those of the aforementioned optical module 10, and the description thereof will be omitted.

The lower base 24D mounts the optical de-multiplexer 26, the optical reflector 27, a plurality of second lenses 28, and a plurality of PDs 29 thereon. A feature of the present optical module 10A is that the de-multiplexer 26 and the optical reflector 27 are mounted on the top surface 24Db of the lower base 24D, where the top surface 24Db is substantially in parallel to the bottom 21 of the housing 12, while, the aforementioned optical module 10 mounts those optical components on the bottom surface of the upper base 25. As shown in FIG. 10B, the second lens 28 and the PDs 29 are vertically set in a space 24D3 surrounded by the sides 24Da. This arrangement, similar to the arrangement of the aforementioned optical module 10, may save a space in the package, and generate an additional space to install electronic devices.

Referring to FIG. 10A, the optical de-multiplexer 26 of the present embodiment integrates the optical reflector $26a_2$ and a transparent body 26c substantially transparent for light with wavelengths, $\lambda_1$ to $\lambda_4$, with a plurality of optical filters $26b_2$. The optical reflector $26a_2$ reflects optical signals with wavelengths, $\lambda_1$ to $\lambda_4$, while, each of filters $26b_2$ transmits the corresponding one of optical signals with a specific wavelength. The optical signals filtered by the optical de-multiplexer 26, which includes four (4) signals each having the one of wavelengths, $\lambda_1$ to $\lambda_4$, advance to the optical reflector 27 through the transparent body 26c, are reflected by the reflecting surface 27a downward, and advance to the second lens 28.

Note that, the optical signals output from the optical de-multiplexer 26 enter the side of the optical reflector 27 and advance within the optical reflector 27 to be reflected by the reflecting surface 27a. On the other hand, the aforementioned optical module reflects the optical signals output from the optical de-multiplexer directly by the reflecting surface 27a without penetrating within the optical reflector 27. In order to suppress optical noises, or unintentional multiple reflections, the surface of the optical reflector 27 facing the optical de-multiplexer 26 is preferably coated with an anti-reflective film.

The lower base 24D, which is made of insulating material, such as ceramics typically aluminum oxide (Al2O3) or silica glass, has a front portion 24D1 with a rectangular block and a rear portion 24D2 extending from the rear end of the front portion 24D1. The front portion 24D1 mounts the optical de-multiplexer 26 on the top surface 24Db thereon, while, the rear portion 24D2 provides a bottom wall 24De, and a pair of side walls 24Da each extending from the rear end of the front portion 24D1. The optical reflector 27 is mounted on the top 24Dc of the side walls 24Da. The bottom wall 24De and the side walls 24Da forms the space 24D3 into which the second lens 28 and the PDs 29 are set in the vertical arrangement. The rear portion 24D2 provides steps 24Dd in both inner surfaces of the side walls 24Da and the second lens 28 is mounted thereon, while, the PDs 29 is directly mounted on the top surface 24Df of the bottom wall 24De of the lower base 24.

Figure 11A:
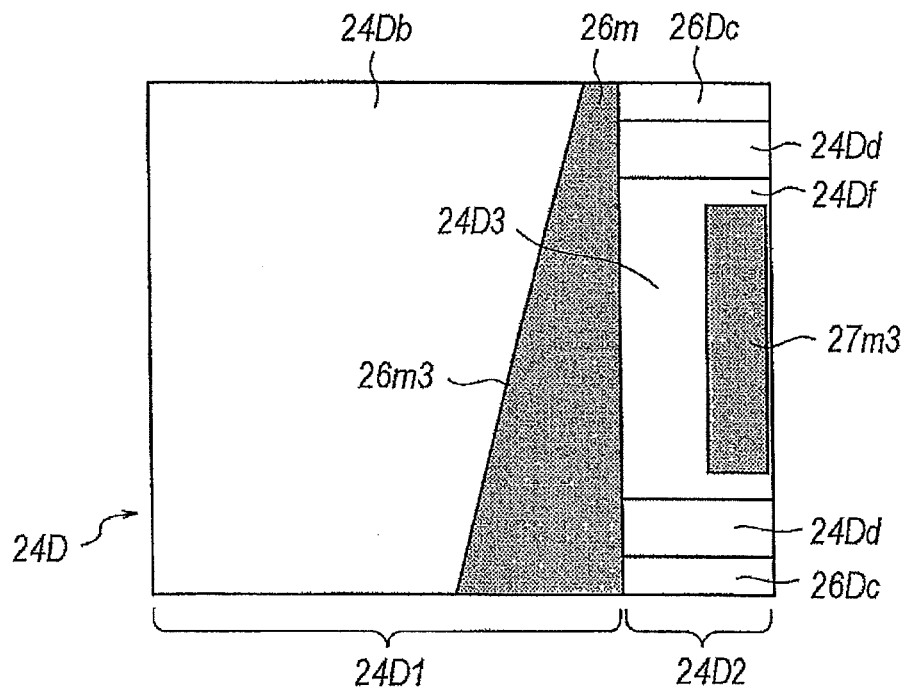
FIGS. 11A and 11B show plan views of the intermediate assembly shown in FIG. 9 before and after the optical reflector is mounted on the base, respectively.
Figure 11B:
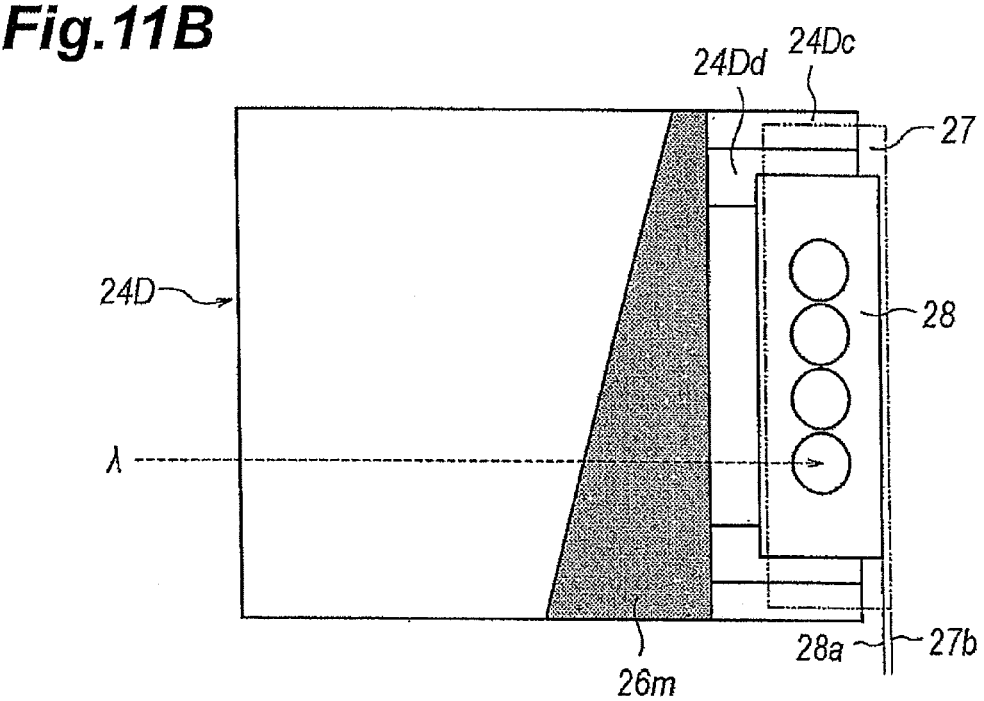

Referring to FIGS. 11A and 11B, where they show plan views of the intermediate assembly of the optical module 10A before and after the optical reflector 27 is mounted, respectively. The top 24Db of the front portion 24D1 provides a mark 26m along the edge of the front portion 24D1. The front edge 26m3 of the mark 26m makes an inclined angle with respect to the side of the front portion 24D1, or the rear edge thereof. The optical de-multiplexer 26 is mounted such that the rear edge of the transparent body 26c is aligned therewith.

Referring to FIG. 11A, the top 24Df of the bottom wall 24De provides another alignment mark 27m3 to align the PDs 29. Aligning the PDs 29 with the mark 27m3 according to an algorithm described later, the optical components of the optical de-multiplexer 26, the optical reflector 27, the second lens 28, and the PDs 29 are assembled on the lower base 24D as the intermediate assembly. This arrangement of the intermediate assembly may facilitate the alignment of respective components and the process to form the optical module 10A even the optical module 10A provides four (4) PDs 29.

Figure 12C:
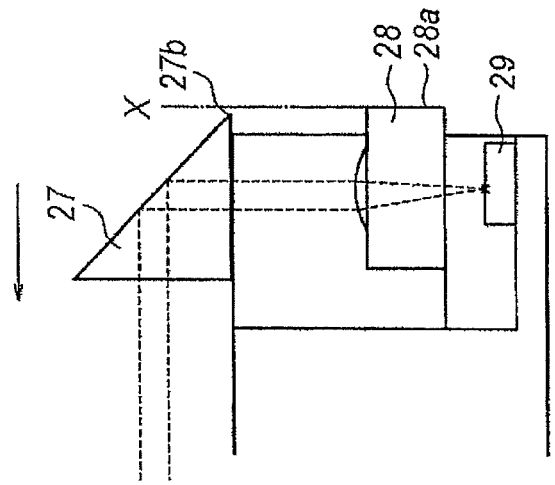
FIGS. 12A to 12C schematically illustrate the optical alignment of the optical reflector with the second lens 28.
Figure 12B:
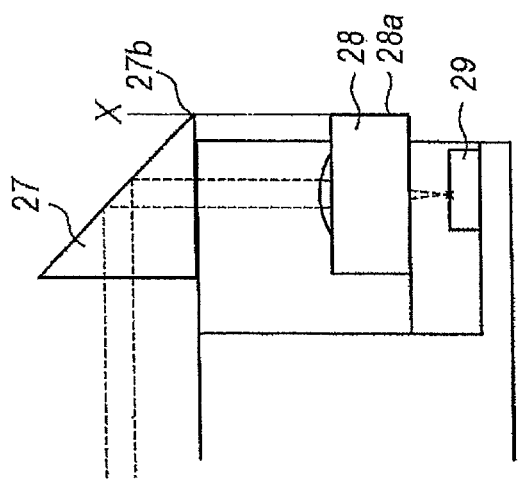
Figure 12A:
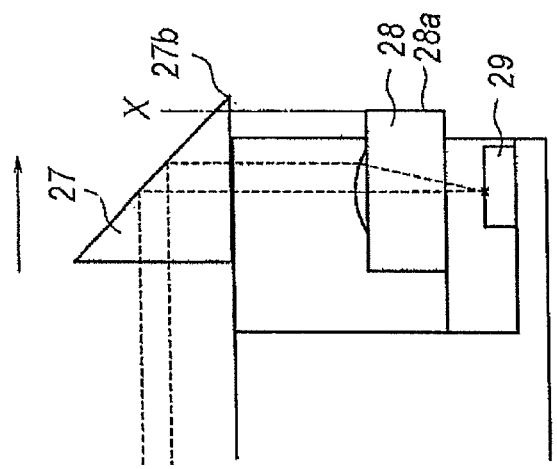

Next, the method to align optical de-multiplexer 26, the optical reflector 27, the second lens 28, and the PD 29 with respect to the lower base 24D will be described as referring to FIGS. 11B, 12A, 12B, and 12C, where FIG. 11B is a plan view of the lower base 24 with the second lens 28, and FIGS. 12A to 12C schematically show the positional relation between the optical reflector 27, the second lens 28, and the PDs 29.

The process first places the PDs 29 on the top surface 24Df of the bottom wall 24De of the lower base 24D as using the mark 27m3 provided on the top surface 24Df. Although FIG. 11A illustrates a rectangular as the mark 27m3, other shapes such as a line extending along one of edges of the mark 27m3, a plurality of L-shaped indices whose corner is in the corresponding corner of the rectangular, and so on, are usable. The process then mounts the second lens 28 on the step 24Dd in the rear space 24D3. Assuming a radius of respective PDs 29 is d, the process aligns the second lenses 28 such that the center of respective lenses is within ±d from the center of the light-sensitive area of the PDs 29 corresponding to the lens.

Then, the optical reflector 27 is mounted on the top 24Dc of the sides 24Da of the lower base 24D such that the rear edge of the optical reflector 27 becomes substantially in parallel to the edge of the second lens 28 with the arrayed arrangement by using, for instance, image recognition techniques. Sliding the optical reflector 27 on the top 24Dc of the sides 24Da longitudinally along the sides 24Da, the light emitted from the optical de-multiplexer 26 aligns the optical axis thereof with the center of the second lens 28. Tilting the optical reflector 27 with respect to the sides 24Da, all second lenses 28 may be aligned with respective filters 26b2.

FIGS. 12A to 12C schematically illustrate the optical alignment of the optical reflector 27 with the second lens 28. Assuming the rear edge 28a of the second lens 28 is the reference position denoted by X, the optical reflector 27 is preferably designed such that the optical axis bent by the optical reflector 27 aligns with the center of the second lens 28 when the rear edge 27b of the optical reflector 27 aligns with the reference X. In such an arrangement, even when the optical reflector 27 is misaligned, for instance, to the rear side as shown in FIG. 12A, or to the front side as shown in FIG. 12C; the PDs 29 may effectively sense the optical beams condensed by the second lens 28. Thus, the focal point of the second lens 28 for the collimated beam, at which the PD 29 receives the optical beam, is independent of the incident position of the second lens 28. Aligning the second lens 28 with the PD 29 precisely, the misalignment of the optical reflector 27 does not cause a fatal failure for the optical module 10A.

Figure 13:
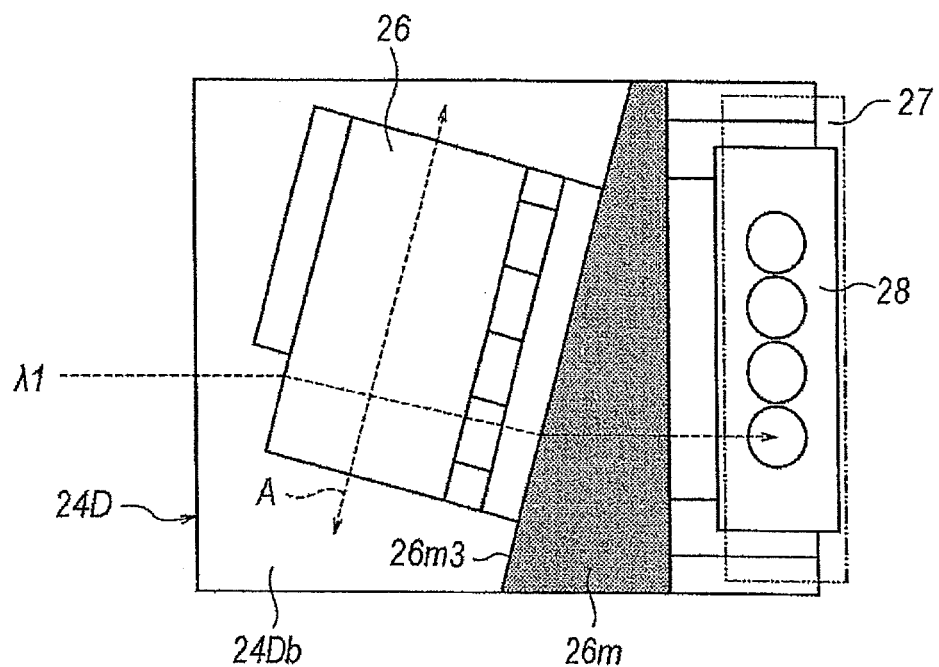
FIG. 13 is a plan view showing the alignment of the optical de-multiplexer on the base.

The process then aligns the optical de-multiplexer 26 with the mark 26m on the lower base 24D. FIG. 13 is a plan view showing the alignment process of the optical de-multiplexer 26 on the lower base 24D. The optical de-multiplexer 26 is picked by, for instance, a collet or a tool similar to the collet with the mechanism to slide and rotate a picked subject horizontally with respect to the edge 26m3 of the mark 26m. Aligning the edge of the optical de-multiplexer 26 with the edge 26m3 of the mark 26m, then, sliding laterally the optical de-multiplexer 26 along the direction denoted by the arrow A as practically illuminating the optical de-multiplexer 26 with sensing light having a wavelength of $\lambda_1$, the optical de-multiplexer 26 is fixed at a position where the PD 29 that receives the sensing light outputs a maximum photocurrent. The sensing light, as shown in FIG. 13, makes the refraction twice at the interfaces, accordingly, the optical axis of the light incoming to the optical de-multiplexer and that of the light outgoing therefrom make an offset therebetween, which makes the optical alignment in complex. However, the arrangement according to the present module, where the optical de-multiplexer 26 slides along the edge 26m3 of the mark 26m only displaces in parallel the optical axis of the light outgoing from the optical de-multiplexer 26.

Figure 14A:
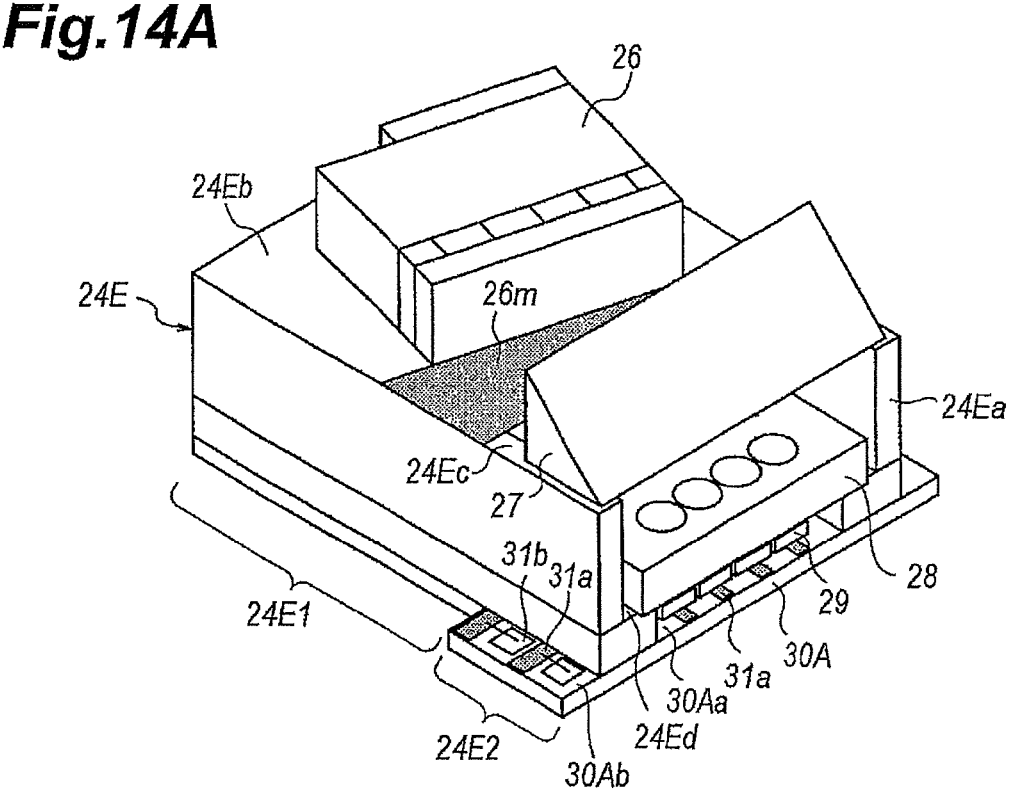
FIG. 14A is a perspective view of an intermediate assembly including a modified base.

FIG. 14A is a perspective view of another intermediate assembly that provides a lower base 24E modified from the aforementioned lower base 24D. The lower base 24E, which is made of multi-layered ceramics, also includes the front portion 24E1 of a rectangular block and the rear portion 24E2 providing the side walls 24Ea extending from the front portion 24E1. The front portion 24E1 includes three layers of ceramics, while, the rear portion 24E2 includes two layers of ceramics except for the lowermost layer in the front portion 24E1. Instead, the rear portion 24E2 provides a circuit substrate 30A with a function of the aforementioned sub-mount 30, or the bottom wall 24De. The circuit substrate 30A has a thickness substantially equal to a thickness of the lowermost layer of the ceramics.

The uppermost layer of the ceramics mounts the optical de-multiplexer 26 on the top 24Eb thereof in the front portion 24E1, while, the side walls 24Ea mount the optical reflector 27 in the top 24Ec thereof. The intermediate ceramics layer extends inward to the space, into which the second lens 28 and the PD 29 are vertically placed, to form the step 24Ed on which the second lens 28 is mounted.

Figure 14B:
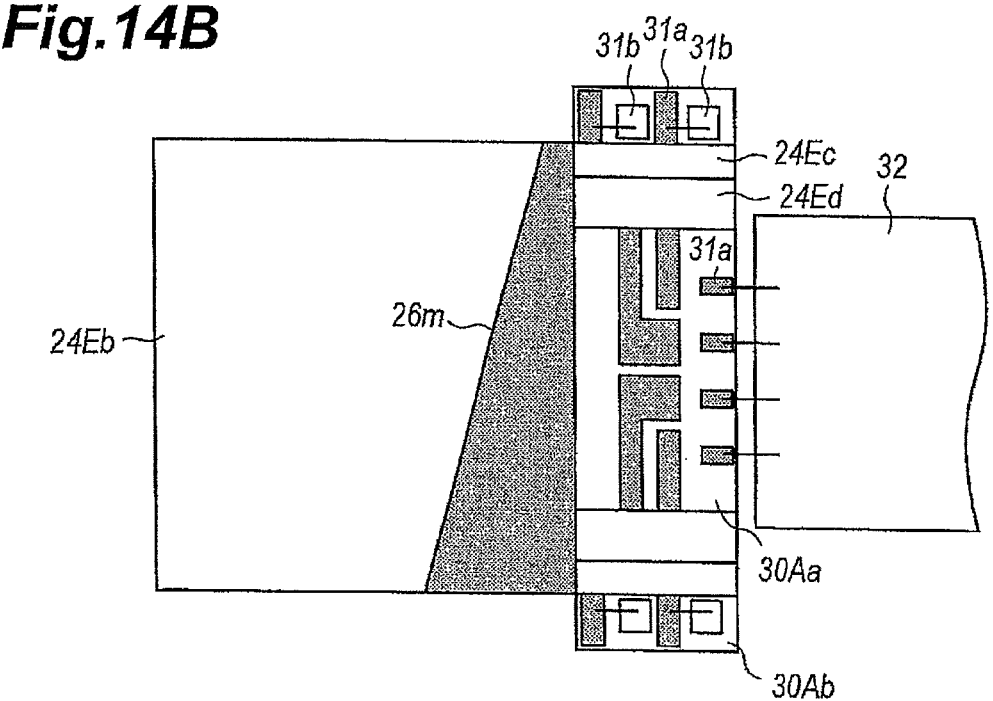
FIG. 14B is a plan view of the base shown in FIG. 14A before mounting the optical components thereon.

The substrate 30A extended from the side walls 24Ea not only mounts the PD 29 on the top surface 30Aa thereof but provides interconnections 31a electrically connected to the PDs 29 and some electronic pads 31b. The PD 29 outputs an electrical signal on the interconnections 31a and biased via the pads 31b. In particular, the pads 31b provided in the area extended from the side walls 24Ea are for supplying the bias to the PDs 29, while, the other pads 29b formed close to the PDs 29 are for conducting electrical signals from the PDs 29 to the amplifier 32 placed behind the intermediate assembly, as shown in FIG. 14B which is a plan view of the lower base 24E but not mounting the optical components thereon. The amplifier 32 is placed behind the lower base 24E.

Third Embodiment

Figure 15:
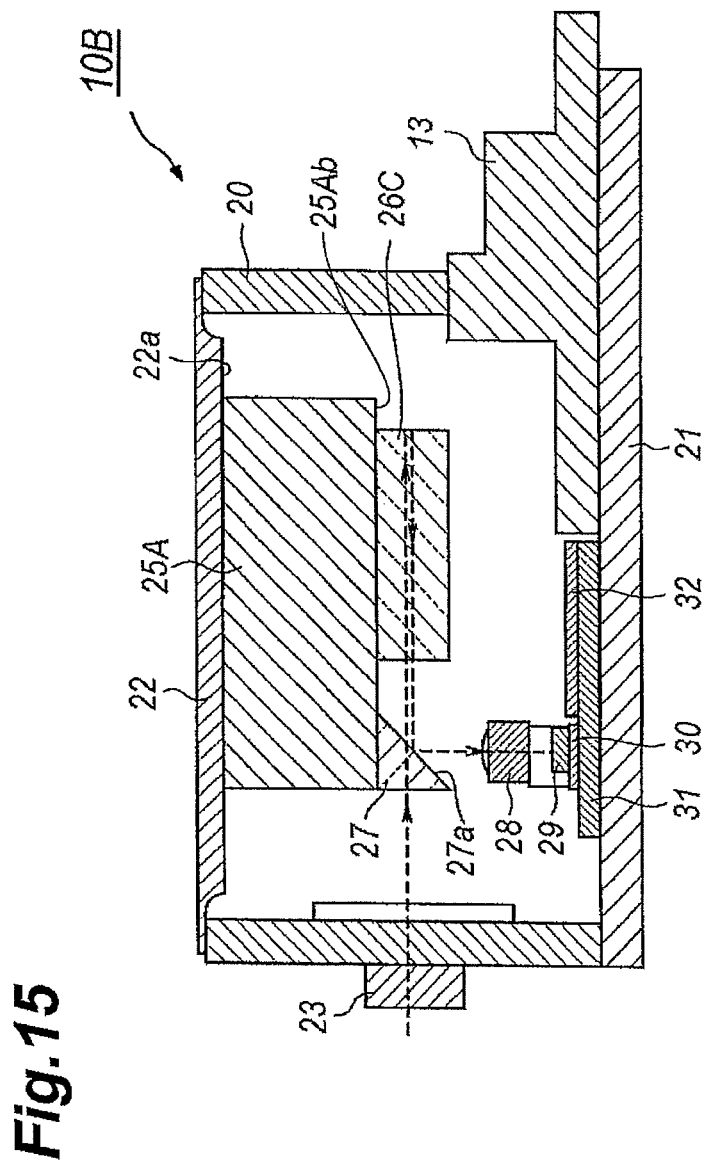
FIG. 15 shows a cross section of an optical module according to a still another embodiment of the invention.

FIG. 15 is a cross section of an optical module 10B according to a still another embodiment of the invention. Features of the optical module 10B shown in FIG. 15 are the upper base 25A, which mounts the optical de-multiplexer 26C and the optical reflector 27 thereon, is attached to the lid 22, specifically, the inner surface 22a of the lid 22, and the light incoming from the coupling unit 11, which is not illustrated in FIG. 15, advances to the optical de-multiplexer 26C as escaping the optical reflector 27, is reflected by the rear end of the optical de-multiplexer 26C and filtered thereby, is reflected by the optical reflector 27 in the reflecting surface thereof 27a to bend the optical axis by a right angle, and enters the PD 29 through the second lens 28.

The surface 25Ab of the upper base 25A on which the optical components are mounted is apart from the bottom 21 of the housing 12 to form an enough space where the amplifier 32 and some other electric components are mounted. In the embodiment shown in FIG. 15, the optical reflector 27, the second lens 28 and the PD 29 are vertically arranged to save the space in the housing 12. The arrangement shown in FIG. 15 has an advantage to omit a member to support the upper base 25A from the bottom 21 of the housing 12, because the upper base 25A is supported by the lid 22, which further generates an excess space to mount the electronic components.

When the lid 22, which is assembled with the intermediate assembly of the upper base 25A, the optical de-multiplexer 26C, and the optical reflector 27, is attached to the sides 20 of the housing 12, the optical alignment between the coupling unit 11 attached to the holder 23 and the PD 29 on the bottom 21 of the housing 12 are carried out by sliding the lid 22 laterally about ±100 μm and rotating about 1° on the sides 20. The adjustment within such dimensions does not affect the welding of the lid 22 with the sides 20.

As described, the light coming from the coupling unit 11 through the holder 23 advances to the optical de-multiplexer 26C as escaping the optical reflector 27, enters the optical de-multiplexer 26C to be filtered thereby to generate a plurality of optical beams each having a specific wavelength different from others, is reflected by the reflecting surface 27a of the optical reflector 27 to advance to the PD 29.

Figure 16A:
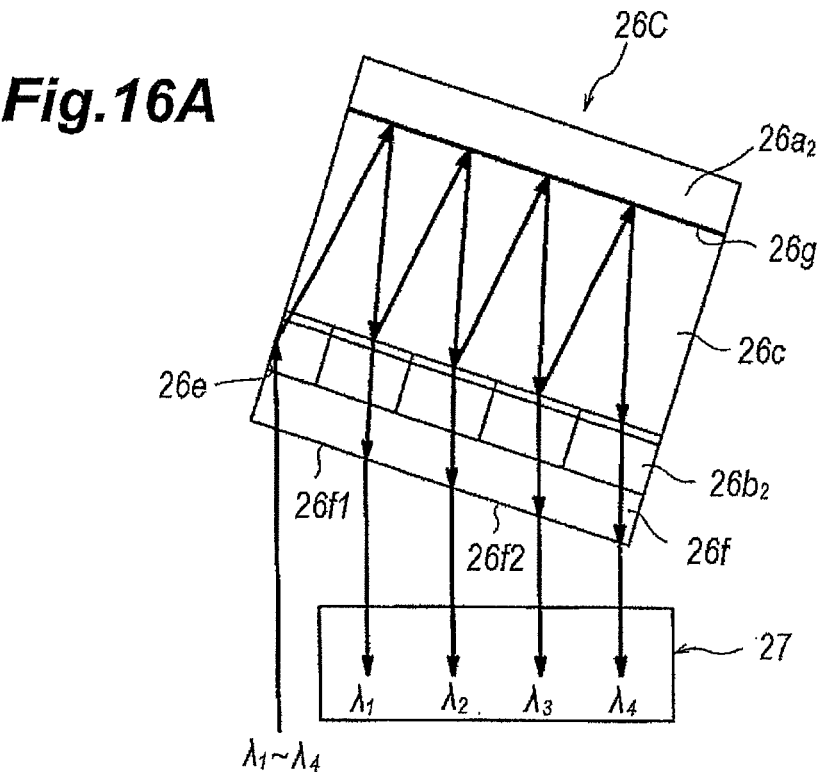
FIG. 16A schematically illustrates the optical beams processed by an optical de-multiplexer installed in the optical module shown in FIG. 15, and FIG. 16B schematically illustrates the optical beams processed by another optical de-multiplexer installed in the optical module shown in FIG. 15.

FIG. 16A is a plan view schematically illustrating the optical beams processed by the optical de-multiplexer 26C. The optical de-multiplexer 26C of the present embodiment has an arrangement similar to the aforementioned optical de-multiplexer 26B. That is, the optical de-multiplexer 26C integrates the optical reflector $26a_2$ and the optical filters $26b_2$ with the transparent body 26c. In addition to those elements, the optical de-multiplexer 26C of the present embodiment provides another transparent member 26f attached to the surface of the optical filter $26b_2$. The transparent member 26f defines the incident surface 26f1 and the light emitting surface 26f2, both of which face the optical reflector 27. The incident surface 26f1 and the emitting surface 26f2 are preferably coated with the anti-reflecting coating.

The optical de-multiplexer 26C of the present embodiment further provides a light reflecting surface 26e to reflect light entering the optical de-multiplexer 26C totally toward the optical reflector $26a_2$. The light reflecting surface may be formed by the polishing of the transparent member 26f. The light entering the optical de-multiplexer 26C at the incident surface 26f1 and having the wavelengths of $\lambda_1$ to $\lambda_4$ is totally reflected at the light reflecting surface 26e toward the optical reflector $26a_2$. Being reflected at the interface between the optical reflector $26a_2$ and the transparent body 26c, the light with wavelengths of $\lambda_1$ to $\lambda_4$ enters the one of the optical filters $26b_1$. Only the optical signal with the wavelength $\lambda_1$ passes the first filter but the rest of the optical signals are reflected thereat and advances to the optical reflector $26a_2$ again. The light with the wavelength $\lambda_1$ is emitted from the emitting surface toward the optical reflector 27. While, the optical signals with wavelengths of $\lambda_2$ to $\lambda_4$ are reflected by the optical reflector $26a_2$ and advances to the second filter $26b_2$. Only the optical signal with the wavelength $\lambda_2$ passes the second optical filter $26b_2$ to be emitted from the emitting surface 26f2, while, the rest of the optical signals is reflected thereat to advance to the optical reflector 27. The optical signals each having the wavelengths different from others are emitted from the light emitting surface 26f2 physically with a constant span therebetween. Thus, the optical de-multiplexer 26C effectively distinguishes the optical signal incoming from the coupling unit 11 with the physical displacement therebetween depending on the wavelengths thereof. The second lens 28 and PD 29 receive thus divided optical signals independently.

The arrangement of the optical de-multiplexer 26C and the optical reflector 27 of the present embodiment in which, specifically, the de-multiplexed optical signals advance to the side of the optical coupling unit, generates an excess space to install the electronic components within the housing 12, and shortens the longitudinal dimension of the housing 12.

Figure 16B:
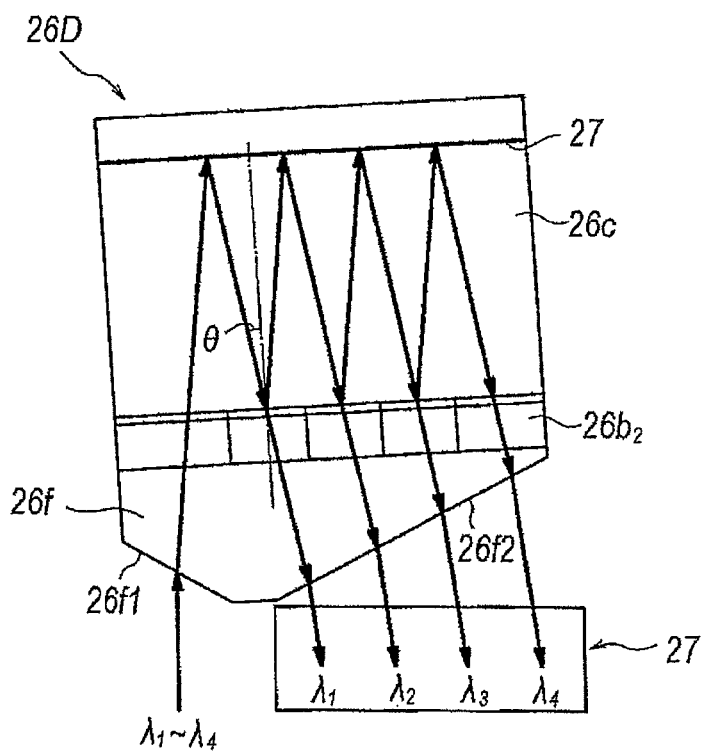

FIG. 16B is a plan view schematically illustrating optical beams processed by an optical de-multiplexer according to still another embodiment of the invention. The optical de-multiplexer 26D also provides the light incident surface 26f1 and the light emitting surface 26f2, each facing the optical reflector 27. A feature of the optical de-multiplexer 26D is that the light incident surface 26f1 makes a substantial angle not 180° with respect to the light emitting surface 26f2. That is, the light incident surface 26f1 and the light emitting surface 26f2 are not the same plane. This arrangement of two surfaces, 26f1 and 26f2, omits the third surface 26e at which the light entering the optical de-multiplexer 26D is totally reflected. However, in the optical de-multiplexer 26D of the present embodiment, the optical beams emitting from the optical de-multiplexer 26D are not in parallel to the optical beam incoming thereto.

Fourth Embodiment

Figure 17:
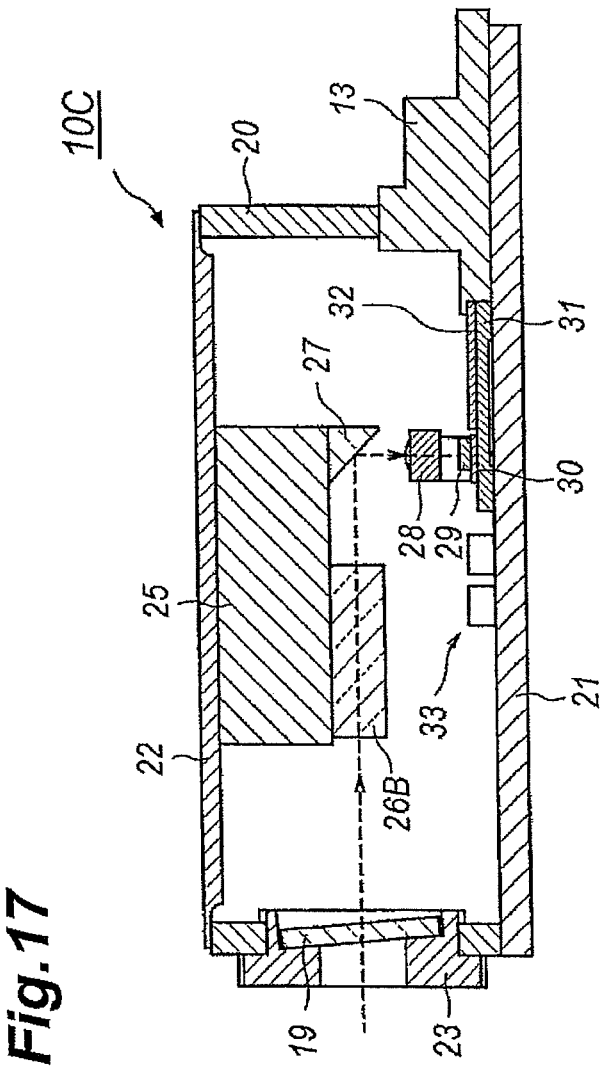
FIG. 17 is a cross section of an optical module according to still another embodiment of the invention.

FIG. 17 shows a cross section of an optical module according to still another embodiment of the invention. The optical module 10C also provides the upper base 25 attached to the inner surface of the lid 22 of the housing 12. A feature of the optical module 10C shown in FIG. 17 is that the optical module 10C provides the optical de-multiplexer 26B with aforementioned arrangement; that is, the optical de-multiplexer 26B provides the light incident surface facing the optical coupling unit 11 but the light emitting surface facing the direction opposite to the light incident surface. The optical beams processed by the optical de-multiplexer 26B advances to the optical reflector 27 set in the rear end of the upper base 25, is reflected thereat vertically toward the bottom 21 of the housing, and enters the PD 29 via the second lens 28. Such arrangement secures an enough space under the optical de-multiplexer 26D where electronic components 33 are mounted.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

The invention claimed is:

1. An optical module that receives optical signals having respective wavelengths specific thereto and different from each other, comprising:
    an intermediate assembly including an optical de-multiplexer, an optical reflector, and a base, the optical de-multiplexer de-multiplexing optical signals depending on the wavelengths, the optical reflector reflecting the de-multiplexed optical signals toward respective photodiodes, the base mounting the optical de-multiplexer and the optical reflector on a top surface thereof;
    a plurality of lenses that concentrate the de-multiplexed optical signals reflected by the optical reflector;
    a plurality of photodiodes receiving the de-multiplexed optical signals concentrated by the lenses, respectively; and
    a housing including a bottom, a side, and a lid to form a space into which the intermediate assembly, the lenses, and photodiodes are enclosed,
    wherein the intermediate assembly is mounted on the bottom of the housing, and
    wherein the photodiodes, the lenses and the optical reflector are arranged vertically with respect to the bottom of the housing.

2. The optical module of claim 1,
    wherein the base includes a first portion and a second portion, the first portion having a rectangular block, the second portion including side walls and a bottom wall, the optical de-multiplexer being mounted on the top surface of the first portion, the optical reflector being mounted on a top of the side walls, the side walls and the bottom wall of the second portion forming a space into which the lenses and the photodiodes are vertically mounted.

3. The optical module of claim 1,
wherein the intermediate assembly is mounted on the lid such that the optical de-multiplexer and the optical reflector are mounted on a surface of the base facing the bottom of the housing.

4. The optical module of claim 1,
wherein the base is made of ceramics.

5. The optical module of claim 2,
wherein the side walls of the second portion provide respective steps each extending inwardly to the space, and
wherein the lenses are mounted on the step, and the photodiodes are mounted on the bottom wall.

6. The optical module of claim 2,
wherein the bottom wall of the base is a circuit substrate providing interconnections and electronic pads, and
wherein the photodiodes output signals on the interconnections as being biased through the electronic pads.

7. The optical module of claim 6,
further including an amplifier to amplify signals output from the photodiodes,
wherein the amplifier is mounted on the bottom of the housing behind the base.

8. The optical module of claim 6,
wherein the circuit substrate has a portion extending outwardly from the side walls, the electronic pads being placed in the portion.

9. The optical module of claim 3,
further including an amplifier to amplify signals output from the photodiodes,
wherein the amplifier is mounted on an area of the bottom of the housing facing the optical de-multiplexer mounted on the base.

10. An optical module that receives optical signals having respective wavelengths specific thereto and different from each other, comprising:
an intermediate assembly including an optical de-multiplexer, an optical reflector, and a base, the optical de-multiplexer de-multiplexing optical signals depending on the wavelengths, the optical reflector reflecting the de-multiplexed optical signals toward respective photodiodes, the base mounting the optical de-multiplexer and the optical reflector thereon,
the optical reflector providing a reflecting surface not facing the optical de-multiplexer,
the optical signals emitted from the optical de-multiplexer entering the optical reflector, advancing within the optical reflector, and are being reflected at the reflecting surface;
a plurality of lenses that concentrate the de-multiplexed optical signals reflected by the optical reflector;
a plurality of photodiodes receiving the de-multiplexed optical signals concentrated by the lenses, respectively; and
a housing including a bottom, a side, and a lid to form a space into which the intermediate assembly, the lenses, and photodiodes are enclosed,
wherein the photodiodes, the lenses and the optical reflector are arranged vertically with respect to the bottom of the housing.

11. The optical module of claim 10,
wherein the optical reflector has an anti-reflecting coating on a surface to which the optical signals output from the optical de-multiplexer enter.

12. The optical module of claim 10,
wherein the base is made of ceramics.

13. An optical module for receiving optical signals having respective wavelengths specific thereto and different from each other, comprising:
an intermediate assembly including an optical de-multiplexer, an optical reflector, and a base, the optical de-multiplexer de-multiplexing optical signals depending on the wavelengths, the optical reflector reflecting the de-multiplexed optical signals toward respective photodiodes, the base mounting the optical de-multiplexer and the optical reflector thereon;
a plurality of lenses that concentrate the de-multiplexed optical signals reflected by the optical reflector;
a plurality of photodiodes receiving the de-multiplexed optical signals concentrated by the lenses, respectively;
a housing including a bottom, a side, and a lid to form a space into which the intermediate assembly, the lenses, and photodiodes are enclosed, where the photodiodes, the lenses and the optical reflector being arranged vertically with respect to the bottom of the housing; and
an optical coupling unit through which the optical signals enter within the housing,
wherein the optical reflector is arranged between the optical de-multiplexer and the optical coupling unit.

14. The optical module of claim 13,
wherein the optical de-multiplexer provides a light incident surface and a light emitting surface each facing the optical reflector.

15. The optical module of claim 13,
wherein the optical de-multiplexer includes an other optical reflector, a transparent body, a plurality of filters, and a transparent member, the filters being put between the transparent body and the transparent member, the other optical reflector reflecting all of optical signals, the transparent body and transparent member being substantially transparent for all of optical signals, each of filters transmitting one of optical signals specific to the filter and reflecting other of optical signals, and
wherein the transparent member provides a light incident surface and a light emitting surface in a side not facing the filters.

16. The optical module of claim 15,
wherein the light incident surface and the light emitting surface are arranged in the same plane.

17. The optical module of claim 15,
wherein the light incident surface and the light emitting surface makes a substantial angle.

18. The optical module of claim 13,
wherein the base is made of ceramics.

* * * * *